United States Patent
Harris et al.

(10) Patent No.: US 8,836,747 B2
(45) Date of Patent: Sep. 16, 2014

(54) MOTOR CONTROL SYSTEM AND METHOD FOR A LASER SCANNING UNIT OF AN IMAGING APPARATUS

(71) Applicant: Lexmark International, Inc., Lexington, KY (US)

(72) Inventors: Steven Jeffrey Harris, Georgetown, KY (US); Simarpreet Singh Rattan, Lexington, KY (US); Kevin Dean Schoedinger, Lexington, KY (US); Ryan Matthew Smith, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 13/633,469

(22) Filed: Oct. 2, 2012

(65) Prior Publication Data

US 2014/0092195 A1 Apr. 3, 2014

(51) Int. Cl.
*B41J 15/14* (2006.01)
*B41J 27/00* (2006.01)

(52) U.S. Cl.
USPC ............................ 347/261; 347/231; 347/243

(58) Field of Classification Search
USPC .................................. 347/231, 243, 259–261
See application file for complete search history.

(56) References Cited

U.S. PATENT DOCUMENTS

| | | |
|---|---|---|
| 3,483,679 A | 12/1969 | Balbierer |
| 3,924,566 A | 12/1975 | Dennie |
| 3,927,937 A | 12/1975 | de Keyzer |
| 4,029,047 A | 6/1977 | Bell |
| 4,030,824 A | 6/1977 | Smith |
| 4,251,155 A | 2/1981 | Schnall et al. |
| 4,281,918 A | 8/1981 | Fortmann |
| 4,282,471 A | 8/1981 | Budniak et al. |
| 4,353,016 A | 10/1982 | Born |
| 4,436,413 A | 3/1984 | Oka |
| 4,459,525 A | 7/1984 | Hasegawa |
| 4,459,675 A | 7/1984 | Bateson et al. |
| 4,517,503 A | 5/1985 | Lin et al. |
| 4,530,594 A | 7/1985 | Adachi |
| 4,591,774 A | 5/1986 | Ferris et al. |
| 4,593,997 A | 6/1986 | Fox et al. |
| 4,601,569 A | 7/1986 | Garris |

(Continued)

FOREIGN PATENT DOCUMENTS

JP 2000083392 A * 3/2000 ................ H02P 5/00

OTHER PUBLICATIONS

U.S. Appl. No. 14/038,560, entitled "Method and System for Controlling a Fuser Assembly", filed Sep. 26, 2013.

*Primary Examiner* — Hai C Pham
(74) *Attorney, Agent, or Firm* — William F. Esser

(57) ABSTRACT

A scanning system for use in an imaging apparatus includes a mirror assembly having a rotating mirror with a plurality of facets, a motor operatively coupled to the rotating mirror and closed loop control circuitry coupled to the motor. The mirror assembly generates a lock signal indicative of whether or not the motor is substantially at a target speed. A controller is communicatively coupled to the mirror assembly for controlling rotation of the rotating mirror, the controller generating a reference signal received by the motor assembly indicating the target speed for the rotating mirror. The reference signal is varied based at least in part upon an acceleration profile that accelerates the motor so that overshoot of the target speed is substantially reduced.

20 Claims, 5 Drawing Sheets

(56) References Cited

U.S. PATENT DOCUMENTS

| | | |
|---|---|---|
| 4,623,827 A | 11/1986 | Ito |
| 4,627,716 A | 12/1986 | Oka |
| 4,630,653 A | 12/1986 | Kan |
| 4,638,225 A | 1/1987 | Morinaga et al. |
| 4,650,312 A | 3/1987 | Vineski |
| 4,660,960 A | 4/1987 | Fukunaga et al. |
| 4,689,540 A | 8/1987 | Tani et al. |
| 4,711,561 A | 12/1987 | Tsuruoka |
| 4,819,030 A | 4/1989 | Shibano |
| 4,819,578 A | 4/1989 | Koiso et al. |
| 4,849,791 A | 7/1989 | Hagihara et al. |
| 4,870,449 A | 9/1989 | Brown |
| 4,885,515 A | 12/1989 | Kurakake et al. |
| 4,891,678 A | 1/1990 | Ishuzu et al. |
| 4,941,022 A | 7/1990 | Ohmura et al. |
| 4,958,196 A | 9/1990 | Fujii et al. |
| 4,974,031 A | 11/1990 | Koiso et al. |
| 4,982,231 A | 1/1991 | Matsuuchi |
| 4,985,734 A | 1/1991 | Honda et al. |
| 5,031,001 A | 7/1991 | Kusumoto |
| 5,038,180 A | 8/1991 | Niki |
| 5,089,761 A | 2/1992 | Nakazawa |
| 5,113,227 A | 5/1992 | Miyasaka |
| 5,128,724 A | 7/1992 | Hayashi et al. |
| 5,130,756 A | 7/1992 | Taniyama |
| 5,132,740 A | 7/1992 | Okamoto et al. |
| 5,138,394 A | 8/1992 | Watanabe et al. |
| 5,260,755 A | 11/1993 | Imaizumi |
| 5,309,211 A | 5/1994 | Yoshioka |
| 5,341,199 A | 8/1994 | Thorp et al. |
| 5,355,199 A | 10/1994 | Bray |
| 5,367,234 A | 11/1994 | DiTucci |
| 5,378,975 A | 1/1995 | Schweid et al. |
| 5,383,578 A | 1/1995 | Nishimura |
| 5,440,376 A | 8/1995 | Hagihara |
| 5,444,522 A | 8/1995 | Owens, Jr. |
| 5,486,747 A | 1/1996 | Welch |
| 5,500,716 A | 3/1996 | Morishita et al. |
| 5,534,988 A | 7/1996 | Gerbasi |
| 5,541,714 A | 7/1996 | Watanabe et al. |
| 5,585,894 A | 12/1996 | Araya et al. |
| 5,594,541 A | 1/1997 | Bonislawski, Jr. et al. |
| 2,625,264 A | 4/1997 | Yoon |
| 5,625,269 A | 4/1997 | Ikeda |
| 5,634,186 A | 5/1997 | Villalobos-Garcia et al. |
| 5,663,624 A | 9/1997 | Callaway |
| 5,708,952 A | 1/1998 | Taniguchi et al. |
| 5,723,957 A | 3/1998 | Ishikawa |
| 5,737,483 A | 4/1998 | Inaji et al. |
| 5,821,970 A | 10/1998 | Sasaki et al. |
| 5,875,382 A | 2/1999 | Inoue |
| 5,918,085 A | 6/1999 | Rollins et al. |
| 5,923,931 A | 7/1999 | Kishimoto |
| 5,933,690 A | 8/1999 | Sugimoto et al. |
| 5,936,371 A | 8/1999 | Bolash et al. |
| 5,937,235 A | 8/1999 | Huss et al. |
| 5,952,798 A | 9/1999 | Jones et al. |
| 5,963,006 A | 10/1999 | Otani |
| 5,995,774 A | 11/1999 | Applegate et al. |
| 6,014,541 A | 1/2000 | Kato et al. |
| 6,091,216 A | 7/2000 | Takahashi et al. |
| 6,107,763 A | 8/2000 | Rossi |
| 6,154,619 A | 11/2000 | Boockholdt et al. |
| 6,160,975 A | 12/2000 | Bartley et al. |
| 6,266,511 B1 | 7/2001 | Murakami et al. |
| 6,298,217 B1 | 10/2001 | Murayama et al. |
| 6,308,036 B1 | 10/2001 | Taniyama et al. |
| 6,438,321 B1 | 8/2002 | Lin |
| 6,505,127 B1 | 1/2003 | Togami |
| 6,534,948 B2 | 3/2003 | Ohura et al. |
| 6,710,572 B2 | 3/2004 | Okubo |
| 6,828,752 B2 | 12/2004 | Nakatsugawa et al. |
| 6,901,212 B2 | 5/2005 | Masino |
| 6,933,690 B2 | 8/2005 | Yamamoto |
| 7,187,460 B2 * | 3/2007 | Able et al. ............... 358/1.14 |
| 7,205,738 B2 | 4/2007 | Chapman et al. |
| 7,209,273 B2 * | 4/2007 | Sobue ..................... 359/216.1 |
| 7,274,163 B1 | 9/2007 | Lambert et al. |
| 2003/0044192 A1 | 3/2003 | Brown et al. |
| 2005/0281568 A1 * | 12/2005 | Hashizume ................ 399/27 |

* cited by examiner

MOTOR CONTROL SYSTEM AND METHOD FOR A LASER SCANNING UNIT OF AN IMAGING APPARATUS

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to electrophotographic imaging devices such as a printer or multifunction device having printing capability, and in particular to a control system for rotating the mirror of the laser scan unit thereof.

2. Description of the Related Art

Precise motor speed control is a requirement of a broad array of motor-driven applications. Traditional motor speed control is accomplished with phase-lock loop (PLL) circuitry. PLL circuitry is generally well known in the electronics and communications arts, where they are commonly used for the synthesis and regulation of high frequency, oscillating, electrical signals. PLL circuitry generally synchronizes two signals in frequency by eliminating phase errors between the two. Application of PLL circuitry to motor control systems typically includes generating a periodic signal representative of motor speed and comparing the signal to a reference signal of a desired or target frequency. The PLL circuitry attempts to match the phase, and hence frequency, of the two signals in a single control loop. Based on the phase error signal from the PLL circuitry, the voltage to the motor is increased or decreased to increase or retard its speed, respectively, so as to match the reference frequency signal.

In electrophotographic imaging devices, such as laser printers and copiers, a polygonal mirror, rotated at a substantially constant velocity, deflects one or more modulated laser beams as scan lines that are impinged onto a photoconductive drum. Some existing imaging devices utilize a mirror assembly which include the polygonal mirror, a mirror motor for rotating the polygonal mirror, one or more sensors associated with the motor for sensing the motor speed and/or position, and circuitry including PLL circuitry for use in locking onto an input reference signal. In such assemblies, the sole output signal generated by a mirror assembly is a binary lock signal which indicates whether or not the motor is at the desired speed according to the input reference signal. Electrophotographic imaging devices typically interface with mirror assemblies only through use of the reference signal input thereto and the output lock signal from the mirror assembly.

The circuitry of existing mirror assemblies includes an integrator having an operational amplifier and a passive component network. If the actual mirror motor speed is significantly above or below the target speed corresponding to the reference signal, the integrator can accumulate significant integral error.

In the situation in which the mirror motor starts from a standstill, a full acceleration current amount from the mirror assembly circuitry is provided to the mirror motor. As the motor approaches the target speed, the integrator has sufficient time during startup to add and accumulate significant integral error. Thus, as the motor approaches the target speed and accelerates in a substantially linear manner, the integrator cannot subtract the accumulated error fast enough, and the motor speed overshoots. As the motor speed overshoots the target speed, the integrator begins subtracting from the accumulated integral error. By the time the motor speed falls back into the linear operating range, the integral error has been reduced too much. As a result, the mirror motor reports an under-speed condition and begins repeating cycles of full acceleration, overshoot, undriven, and under-speed until the motor is finally able to settle into the linear operating range. This inability to relatively quickly reach a constant speed band because the energy storage in the system as well as the accumulated integral error, thereby leading to overshoot and undershoot of motor speed, is referred to as "chatter."

SUMMARY

Embodiments of the present disclosure overcome shortcomings in prior motor control systems for polygonal mirrors and thereby satisfy a significant need for improved motor control of the polygonal mirror in electrophotographic imaging devices. In an example embodiment, there is shown a laser scanning unit including a mirror assembly with a rotating mirror having a plurality of facets, a motor operatively coupled to the rotating mirror and closed loop control circuitry coupled to the motor. The closed loop control circuitry generates a lock signal indicative of whether or not the motor is substantially at a target speed. A controller is communicatively coupled to the mirror assembly for controlling rotation of the rotating mirror. The controller generates a reference signal which is received by the motor assembly having a frequency that indicates the target speed for the rotating mirror. The frequency of the reference signal gradually increases towards the target speed according to an acceleration profile. The acceleration profile causes the closed loop control circuitry to gradually accumulate integral error before reaching steady state in which the integral error is substantially constant. By gradually accumulating integral error, the closed loop control circuitry is able to substantially prevent overshoot and undershoot of the accumulated integral error, thereby substantially eliminating chatter and shortening the time to reach steady state such that the laser scan unit becomes available to participate in an imaging operation sooner.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings, wherein.

DETAILED DESCRIPTION

Figure 1:
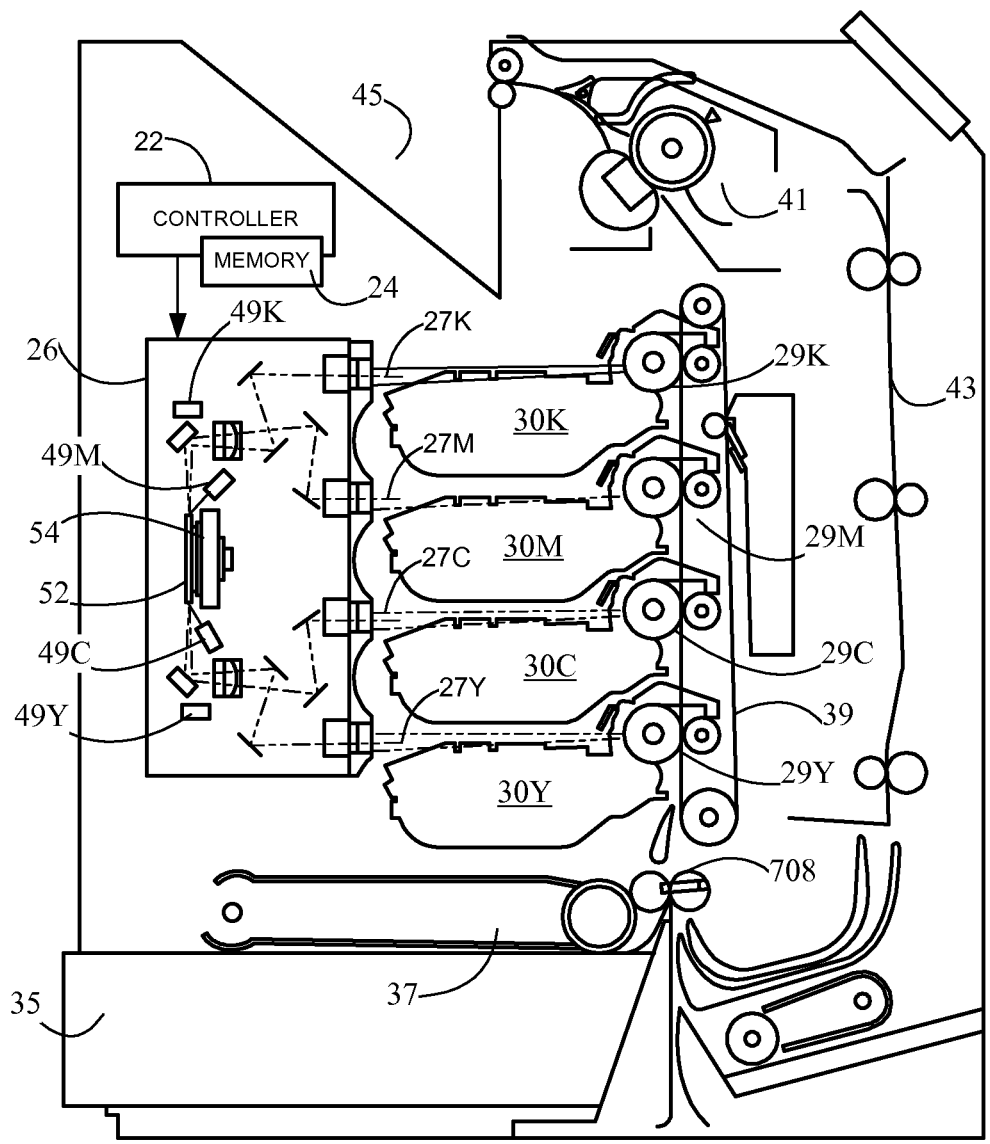
FIG. 1 is cross sectional side view of an electrophotographic imaging device.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Terms such as "first", "second", and the like, are used to describe various elements, regions, sections, etc. and are not intended to be limiting. Further, the terms "a" and "an" herein do not denote a limitation of quantity, but rather denote the presence of at least one of the referenced item.

Furthermore, and as described in subsequent paragraphs, the specific configurations illustrated in the drawings are intended to exemplify embodiments of the disclosure and that other alternative configurations are possible.

Reference will now be made in detail to the example embodiments, as illustrated in the accompanying drawings. Whenever possible, the same reference numerals will be used throughout the drawings to refer to the same or like parts.

FIG. 1 illustrates an imaging apparatus 20 according to an example embodiment. An image to be printed is electronically transmitted to a main system controller 22 from a source such as an external device (not shown). The main system controller 22 may include one or more processors, and other software, firmware and/or hardware logic necessary to control the functions of imaging apparatus 20, and may be implemented as one or more application specific integrated circuits (ASICs). Controller 22 may also include or be associated with a memory 24 which may be any volatile and/or non-volatile memory such as, for example, random access memory (RAM), read only memory (ROM), flash memory and/or non-volatile RAM (NVRAM). Alternatively, memory 24 may be in the form of a separate electronic memory (e.g., RAM, ROM, and/or NVRAM), a hard drive, a CD or DVD drive, or any memory device convenient for use with controller 22.

In the example embodiment shown, imaging apparatus 20 is illustrated as a color laser printer for purposes of discussion and should not be regarded as limiting. For color operation, the image to be printed may be de-constructed into four bitmap images or image data, each corresponding to an associated one of the cyan, yellow, magenta and black (CYMK) image planes, for example, by the controller 22. The controller 22 may initiate an imaging operation whereby a laser scanning unit (LSU) 26 may output first, second, third and fourth modulated light beams 27K, 27Y, 27M, and 27C.

In one example embodiment, LSU 26 may be configured to emit first modulated light beam 27K which forms a latent image on a photoconductive surface or drum 29K of a first image forming station 30K based upon the bitmap image data corresponding to the black image plane. Second modulated light beam 27M from LSU 26 forms a latent image on a photoconductive drum 29M of a second image forming station 30M based upon the bitmap image data corresponding to the magenta image plane. Third modulated light beam 27C forms a latent image on a photoconductive drum 29C of a third image forming station 30C based upon the bitmap image data corresponding to the cyan image plane. Similarly, fourth modulated light beam 27Y forms a latent image on a photoconductive drum 29Y of a fourth image forming station 30Y based upon the bitmap image data corresponding to the yellow image plane. During an imaging operation, each modulated light beam 27 sweeps across its corresponding photoconductive drum 29 in a scan direction that is perpendicular to a media process direction.

Figure 2:
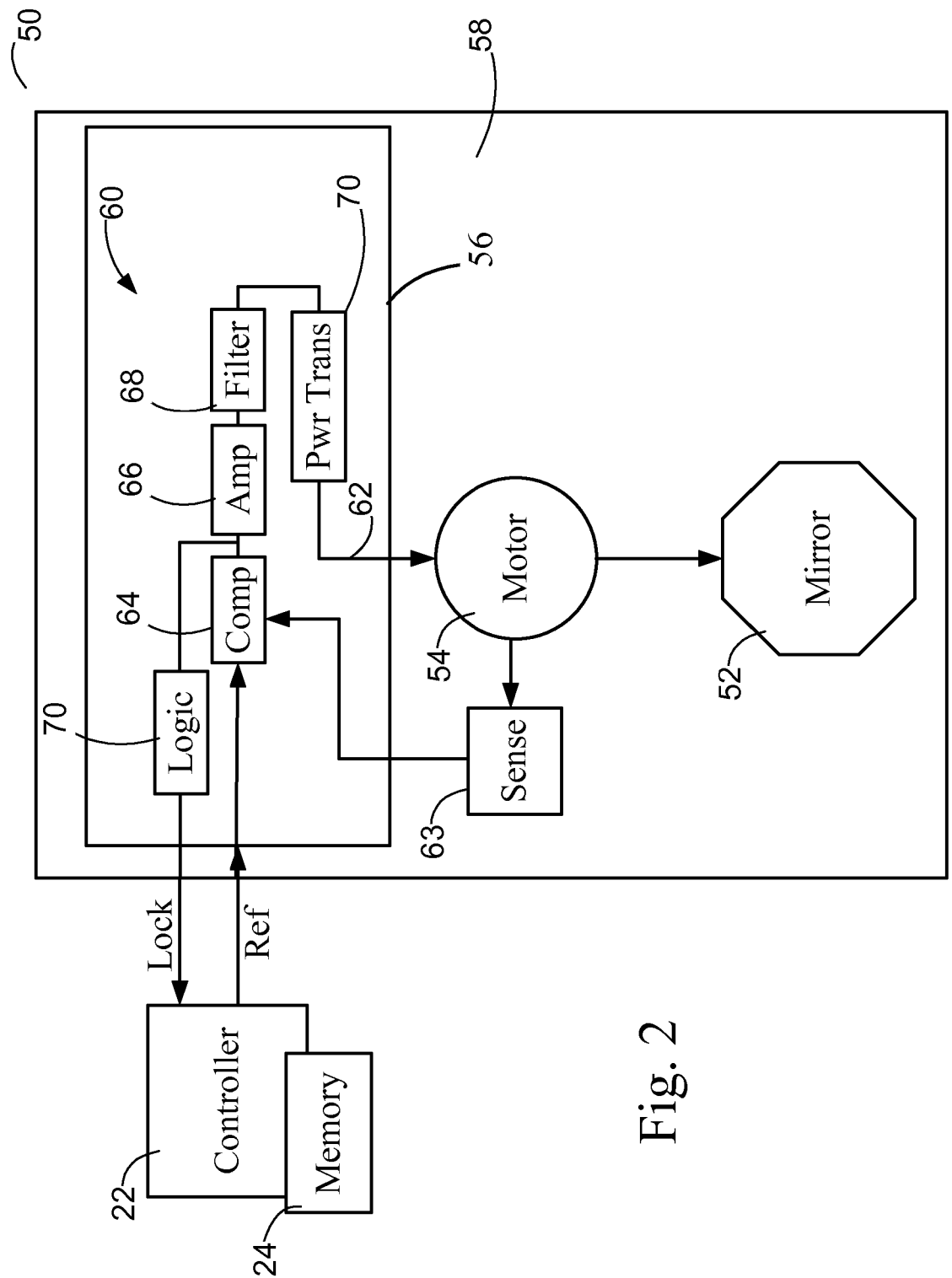
FIG. 2 is a block diagram of the motor control portion of the laser scan unit of the imaging device of FIG. 1 according to an example embodiment.

LSU 26 may include a laser light source 49, illustrated in FIG. 2 as laser light sources 49K, 49M, 49C and 49Y, for each modulated light beam 27. A rotating polygonal mirror 52 deflects the modulated light beams from each mirror facet towards pre-scan optical components, such as mirrors and lenses, so that the modulated light beams 27 impinge the surface of the associated photoconductive drums 29. A motor 54 spins mirror 52 under control of controller 22, as explained in more detail below.

Controller 22 may also coordinate the timing of a printing operation to correspond with the imaging operation by LSU 26, whereby a top sheet of a stack of media is picked up from a media tray 35 by a pick mechanism 37 and is delivered to a media transport belt 39. The media transport belt 39 may carry the sheet past the four image forming stations 30, which selectively apply toner to the sheet in patterns corresponding to the latent images written to their associated photoconductive drums 29. The media transport belt 39 may then carry the sheet 32 with the toned mono or composite color image registered thereon to a fuser assembly 41. The fuser assembly 41 includes a nip that applies heat and pressure to adhere the toned image to the sheet. Upon exiting the fuser assembly 41, the sheet is may either be fed into a duplex path 43 for printing on a second surface thereof, or ejected from the imaging apparatus 20 to an output area 45.

Imaging apparatus 20 is illustrated in FIG. 1 and described above as a color imaging device in which toner from each image forming station 30 is transferred directly to a sheet of media in one step. It is understood that imaging apparatus 20 may be a color imaging device in which toner is transferred from each image forming station 30 onto an intermediate transfer mechanism in a first step, and from the intermediate transfer mechanism to a media sheet in a second step. It is further understood that imaging apparatus 20 may be a monochrome imaging device having only one image forming station 30 for depositing black toner to a media sheet. The general architectures of color imaging devices transferring toner in two steps and monochrome imaging devices are well known and will not be discussed in further detail herein for reasons of simplicity.

Referring now to FIG. 2, a schematic of at least a portion of LSU 26 is shown. LSU 26 includes mirror assembly 50 having polygonal mirror 52, motor 54 and electronics 56, each of which may be mounted to a substrate, such as a printed circuit board 58. As mentioned, motor 54 rotates polygonal mirror 52. Electronics 56 may include PLL circuitry 60 which generally receives a reference signal Ref, in this case from controller 22, and generates output signal 62 for driving motor 54 so that the speed of motor 54 substantially follows the frequency of reference signal Ref. PLL circuitry 60 synchronizes output signal 62 in frequency by eliminating phase errors between it and reference signal Ref. The PLL circuitry 60 attempts to match the phase, and hence frequency, of the two signals in a single control loop. Based on the phase error signal from PLL circuitry 60, the voltage applied to motor 54 is increased or decreased to change its speed so as to match the frequency of reference signal Ref.

Mirror assembly 50 may include a sensing arrangement 63 which senses the actual frequency of motor 54 and provides to phase comparator circuit 64 an output signal corresponding to the sensed frequency. Sensing arrangement 63 may be implemented as, for example, Hall sensors or a field generator winding associated with motor 54. Phase comparator circuit 64 receives reference signal Ref and the output of sensing arrangement 63, and generates a phase error output signal having a voltage according to the phase difference between the two signals. Amplifier 66 receives the output of phase comparator circuit 64 and provides at its output an amplified version thereof. Low pass filter 68 integrates the amplified phase error output signal. The output of filter 68 is provided to the input of power transistors 70 which are configured for driving the windings of motor 54. In this way, PLL circuitry 60 uses the actual frequency of motor 54 in its feedback loop for generating output signal 62 having a frequency that locks to reference signal Ref. PLL circuitry 60 also generates binary lock signal Lock, which may be the output of logic circuitry 70 having as its input the output of phase comparator circuit 64. During the time when PLL circuitry 60 is attempting to lock onto the frequency of reference signal Ref, the value of lock signal Lock is in a first binary state. Once PLL circuitry 60 becomes locked or substantially locked onto reference signal Ref, PLL circuitry 60 drives lock signal Lock to a second binary state.

Because the operation of PLLs is well known, a more detailed description thereof will not be provided for reasons of simplicity.

It is understood that PLL circuitry 60 may include additional circuitry. For example, a counter or divider circuit may be placed in the signal path, such as between the output of sensing arrangement 63 and the input of phase comparator circuit 64 so as to generate an output signal 62 having a frequency that is a multiple of the frequency of reference signal Ref.

It is noted that with mirror assembly 50 being available as a single, integral unit, controller 22 is unable to receive any signal from mirror assembly 50 other than lock signal Lock. As a result, the only available feedback to controller 22 as to motor 54 being accelerated to the target speed is when the target speed is actually reached, indicated by lock signal Lock changing its binary state.

As mentioned, output signal 62 is used to drive motor 54. In an example embodiment, motor 54 is a brushless DC motor. However, it is understood that motor 54 may be other types of motors. It is further understood that electronics 56 and/or PLL circuitry 60 may include additional circuitry for controlling motor 54.

As discussed, existing control systems for spinning a polygonal mirror create an undesirable amount of chatter which results in an extended period of time for the mirror motor to reach steady state and otherwise lock onto target speeds. According to an example embodiment, controller 22 controls PLL circuitry 60 so that the integral error of PLL circuitry 60, corresponding to the output of low-pass filter 68, is gradually accumulated in a more controlled manner so the PLL circuitry 60 reaches steady state, i.e., locks onto reference signal Ref, sooner than seen using prior techniques.

In particular, when motor 54 is locked at the target speed, the proportional error appearing at the output of phase comparator circuit 64 and its derivative error are approximately zero. The integral error, appearing at the output of filter 68, is thus a substantially constant, non-zero value at steady state. Near the operating target speed, it is desirable that the integral error remain non-zero in order to provide a drive signal for mirror 54. In order to reach steady state sooner, the integral error is accumulated gradually and/or relatively slowly until it reaches steady state with a substantially constant value. By controlling the accumulation of the integral error in a more gradual manner, instances of overshoot and undershoot of the integral error, which result in motor chatter, are substantially avoided, thereby allowing the integral error to reach substantially constant, steady state sooner than in prior techniques. Reaching steady state sooner results in LSU 26 being ready to participate in a print operation sooner.

Figure 3:
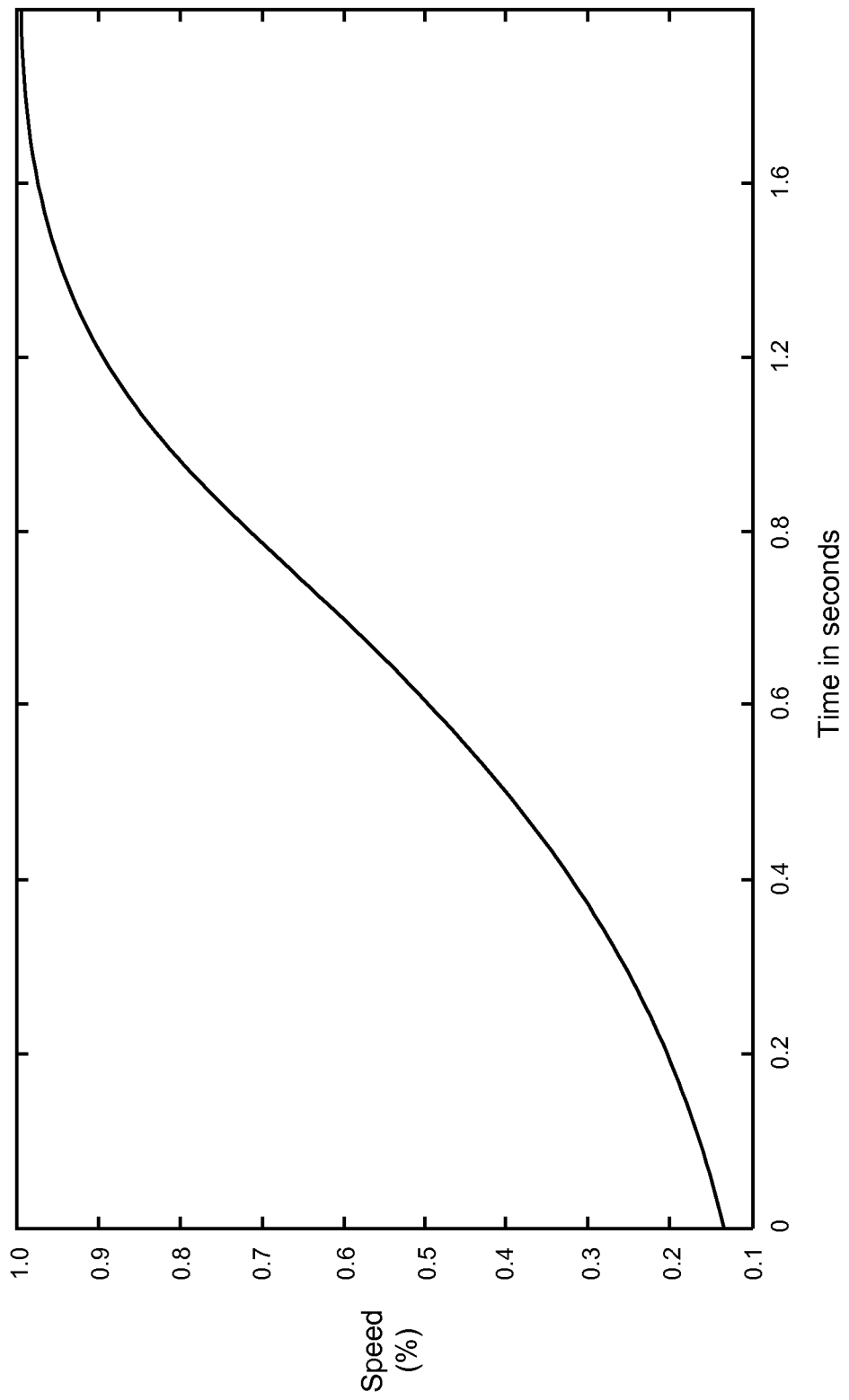
FIG. 3 is an illustration of an acceleration profile utilized by the motor control portion of FIG. 2, together with waveforms of error signals thereof generated during acceleration of the motor of the motor control portion.

Specifically, instead of setting the frequency of reference signal Ref to the target frequency from the time motor 54 is initially commanded to start rotating, in an example embodiment the frequency of reference signal Ref is gradually increased from a predetermined initial value toward the target frequency. Controller 22 gradually increases the frequency of reference signal Ref using an acceleration profile maintained in memory 24. According to an example embodiment, the acceleration profile forms a substantially S-shape. FIG. 3 illustrates a substantially S-shaped acceleration profile in which the frequency of reference signal Ref gradually increases to the target speed over a predetermined period of time, which in this embodiment is less than about 2 seconds. The substantially S-shaped acceleration profile may be obtained through characterization of motor 54 and mirror assembly 50. FIG. 3 also illustrates the proportional error, derivative error, integral error IE and total error over the predetermined period of time. The total error may be represented as Total error=$Kp$*proportional error+$Ki$*integral error+$Kd$*derivative error, where Kp, Ki and Kd are constants. As can be seen, the gradual increase in the frequency of reference signal Ref results in a more controlled proportional error and derivative error which are both approximately zero at the end of the ramp up in frequency of reference signal Ref to the target speed. The integral error IE is shown as also being controlled without overshoot and reaching a substantially constant level sooner. Also shown is the integral error IE' from a prior technique in which overshoot and undershoot is observed from reference signal Ref having the target frequency at the onset of the acceleration ramp. In FIG. 3, the integral error IE can be seen to reach a substantially constant value noticeably sooner than integral error IE', thereby resulting in the total error TE to reach a substantially constant value sooner and allowing PLL circuitry 60 to reach steady state more quickly.

Figure 4:
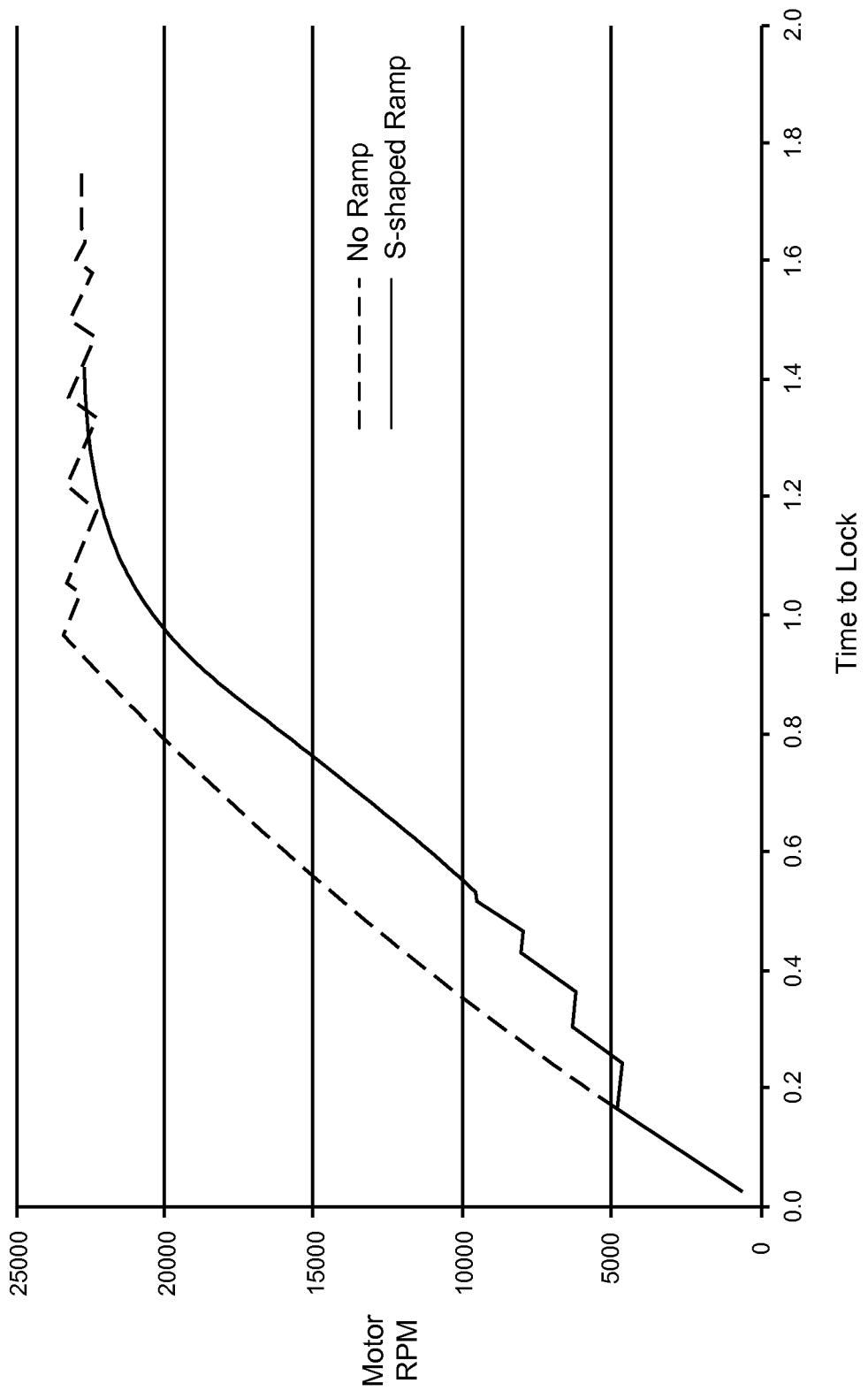
FIG. 4 is graph illustrating the time to stabilize the motor control portion of FIG. 2.

FIG. 4 illustrates the frequency response of motor 54 in which a ramped, substantially S-shaped acceleration profile is used, relative to an existing system in which the reference signal is constant at the target frequency from the beginning of initial ramping of motor 54 thereto. As can be seen in FIG. 4, there is no motor speed overshoot using the substantially S-shaped acceleration profile, and the time to lock to the target frequency is reduced compared to the existing system. LSU 26 having an acceleration profile as described above has been seen to reach steady state speeds for performing an imaging operation in noticeably less than two seconds.

It is understood that other acceleration profiles may be utilized instead of a substantially S-shaped acceleration profile for gradually increasing the speed of motor 54. For example, controller 22 may utilize a profile having one or more linear ramps of the same or different slopes, a stepped profile in which the steps are largely the same size and duration or may vary, a multiple slope ramp, or a combination thereof.

It is further understood that controller 22 may choose an acceleration profile from a plurality of different acceleration profiles maintained in memory 24, for use in controlling motor 54. Different target speeds for motor 54 may be used by imaging apparatus 20 dependent upon a number of factors including desired performance and operating and/or environmental factors, for example. In an example embodiment, an acceleration profile may be selected from a plurality of acceleration profiles based upon a desired target speed of motor 54. Specifically, controller 22 may store a first acceleration profile for bringing motor 54 to a first predetermined target speed, and a second acceleration profile for bringing motor 54 to a second predetermined target speed different from the first predetermined target speed. Memory 24 may store more than two acceleration profiles, any one of which may be selected by controller 22 for use in performing an imaging operation.

The operation of LSU 26 to reach a steady state speed for mirror 52 will be described. When a decision is made by controller 22 that mirror 52 is to be brought to a target speed for use in performing an imaging operation, controller 22 selects from memory 24 an acceleration profile based upon the target speed and having gradually increasing speed values for setting the frequency of reference signal Ref. In the example embodiment described above, the gradually increasing speed values may follow a substantially S-shaped acceleration profile as shown in FIG. 3. Because there is no feedback to controller 22 as to the present speed or position of motor 54, due to only having motor speed information from binary lock signal Lock, the entire acceleration profile may be utilized. Having the frequency of reference signal Ref gradually increased as the speed of motor 54 is increased towards the target speed results in the speed of motor 54 not surpassing or overshooting the target speed and reaching steady state in a shorter period of time.

Figure 5:
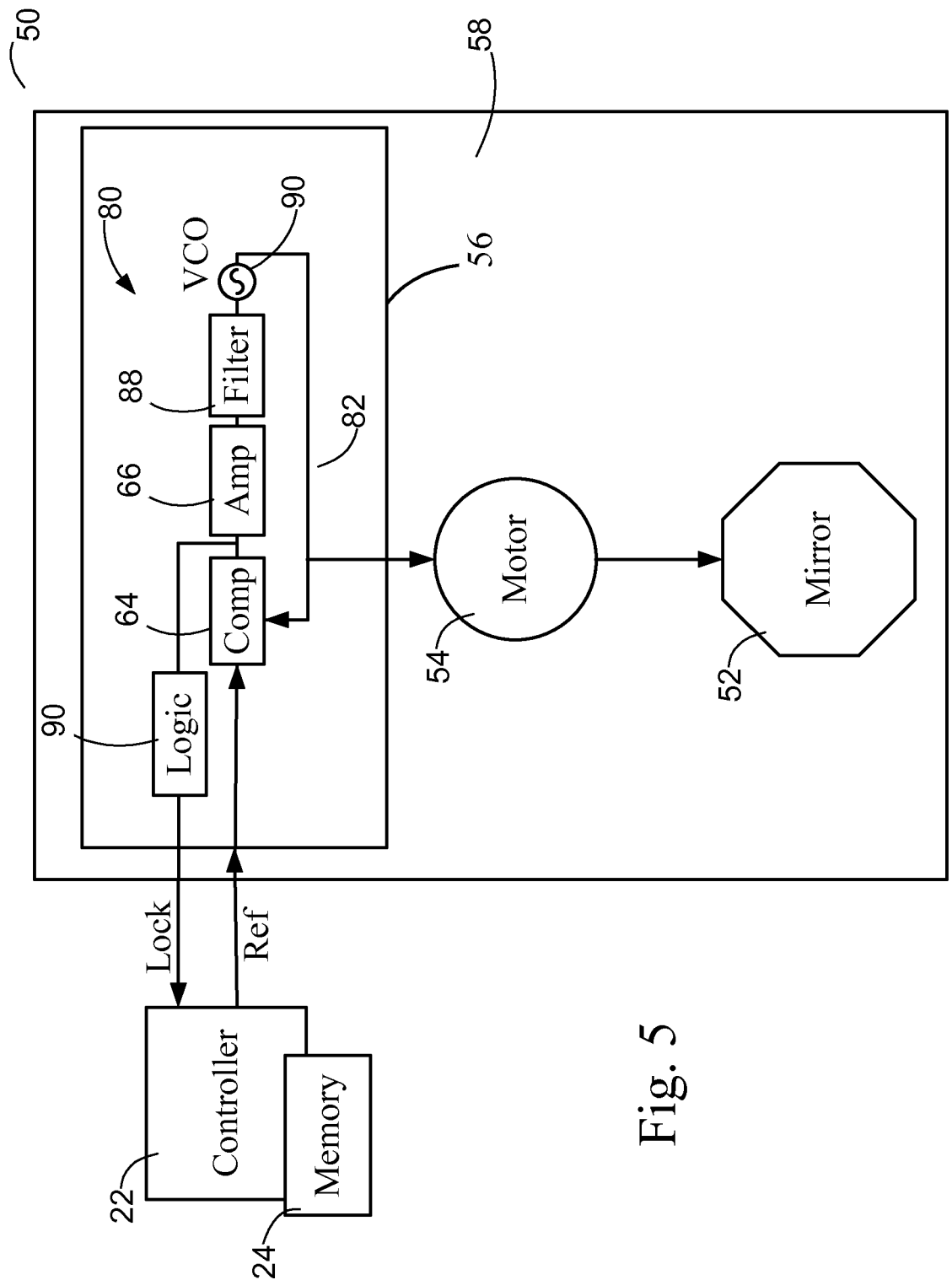
FIG. 5 is a block diagram of the motor control portion of the laser scan unit of the imaging device of FIG. 1 according to another example embodiment.

FIG. 5 illustrates a portion of LSU 26 according to another example embodiment. Electronics 56 may include a different implementation of PLL circuitry. In this embodiment, PLL circuitry 80 generates a periodic signal 82 representative of motor speed and compares the periodic signal 82 to reference signal Ref having the desired frequency. PLL circuitry 80 synchronizes periodic signal 82 in frequency by eliminating phase errors between reference signal Ref and periodic signal 82. The PLL circuitry attempts to match the phase, and hence frequency, of the two signals in a single control loop. Based on the phase error signal from PLL circuitry 80, the voltage to motor 54 is increased or decreased to change its speed so as to match the frequency of reference signal Ref. As shown in FIG. 5, PLL circuitry 80 may include phase comparator circuit 64 which compares the phase of its two input signals, in this case reference signal Ref and periodic signal 82, and generates a phase error output signal having a voltage according to the phase difference between the two signals. Amplifier 66 may receive the output of phase comparator circuit 64 and provide at its output an amplified version thereof. Low pass filter 88 filters the output from amplifier 66 and removes any components of the signals of which the phase is being compared from periodic signal 62. Voltage controlled oscillator (VCO) 90 generates periodic signal 82, the frequency of which can be controlled and swung over the operational frequency band for the closed loop based upon the voltage of the output of filter 88. Combined, PLL circuitry 80 serves to lock periodic signal 82 to the frequency of reference signal Ref. PLL circuitry 80 generates binary lock signal Lock, which may be the output of logic circuitry 90 having as its input the output of phase comparator circuit 64. During the time when PLL circuitry 80 is attempting to lock onto the frequency of reference signal Ref, the value of lock signal Lock is in a first binary state. Once PLL circuitry 80 becomes locked or substantially locked onto reference signal Ref, PLL circuitry 80 drives lock signal Lock to a second binary state.

With respect to the implementation shown in FIG. 5, controller 22 controls PLL circuitry 80 so that motor 54 is maintained at or near its linear range during substantially the entire time motor 54 accelerates to a steady state target speed. By largely maintaining motor 54 so that it accelerates linearly, the accumulation of significant integral error is substantially avoided or otherwise reduced, thereby reducing or substantially eliminating chatter and reducing the time needed for PLL circuitry 80 to lock onto the target speed.

The foregoing description of several methods and example embodiments has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A laser scan unit for an imaging apparatus, comprising:
   a mirror assembly comprising a rotating mirror having a plurality of facets, a motor operatively coupled to the rotating mirror and closed loop control circuitry coupled to the motor, the mirror assembly generating a lock signal indicative of whether or not the motor is substantially at a target speed; and
   a controller communicatively coupled to the mirror assembly for controlling rotation of the rotating mirror, the controller generating a reference signal received by the mirror assembly, a characteristic of the reference signal indicating the target speed for the rotating mirror and varying based at least in part upon an acceleration profile.

2. The laser scan unit of claim 1, wherein the acceleration profile forms a substantially S-shape.

3. The laser scan unit of claim 2, wherein the characteristic of the reference signal is frequency.

4. The laser scan unit of claim 1, wherein the acceleration profile substantially gradually changes the characteristic of the reference signal.

5. The laser scan unit of claim 1, further comprising memory coupled to the controller, the memory storing a plurality of acceleration profiles and the controller selects an acceleration profile from the plurality of acceleration profiles.

6. The laser scan unit of claim 5, wherein the controller selects an acceleration profile from the plurality of acceleration profiles based upon a desired target speed for the motor.

7. The laser scan unit of claim 5, wherein the controller selects an acceleration profile from the plurality of acceleration profiles based upon at least one of an operating condition and an environmental condition of the imaging apparatus.

8. The laser scan unit of claim 1, wherein the acceleration profile accelerates the motor such that an integral error of the closed loop control circuitry reaches a substantially constant value without overshoot thereof.

9. An apparatus, comprising:
   a component configured to undergo movement;

a motor and closed loop control circuitry coupled to the motor, the closed loop control circuitry generating a lock signal indicative of whether or not the motor is substantially at a target speed; and a controller communicatively coupled to the closed loop control circuitry for controlling movement of the component, the controller generating a reference signal received by the closed loop control circuitry, a frequency of the reference signal indicating the target speed for the component and varying based at least in part upon a predetermined acceleration profile.

10. The apparatus of claim 9, wherein the predetermined acceleration profile forms a substantially S-shape.

11. The apparatus of claim 9, wherein the predetermined acceleration profile substantially gradually changes the frequency of the reference signal.

12. The apparatus of claim 9, further comprising memory coupled to the controller, the memory storing a plurality of acceleration profiles and the controller selects an acceleration profile from the plurality of acceleration profiles.

13. The apparatus of claim 12, wherein the controller selects an acceleration profile from the plurality of acceleration profiles based upon a desired target speed for the motor.

14. The apparatus of claim 12, wherein the controller selects an acceleration profile from the plurality of acceleration profiles based upon at least one of an environmental condition and an operating condition of the apparatus.

15. The apparatus of claim 9, wherein the predetermined acceleration profile accelerates the motor toward the target speed without overshoot thereof.

16. The apparatus of claim 9, wherein the component is a rotatable polygonal mirror.

17. A system, comprising:

a motor;

a controller generating a reference signal having a frequency that indicates a speed for the motor, the controller gradually increasing the frequency of the reference signal over a time period from a predetermined initial frequency to a target frequency indicating a target speed for the motor; and closed loop control circuitry coupled to the motor and the controller, and configured to receive the reference signal from the controller and generate a drive signal for the motor that substantially follows the gradually increasing of the frequency of the reference signal over the time period to accelerate the motor to the target speed, wherein the gradually increasing of the frequency of the reference signal accelerates the motor to the target speed without overshoot thereof.

18. The system of claim 17, wherein the time period is from an initial ramping of the motor to a time when the motor reaches steady state at the target speed.

19. The system of claim 17, wherein the frequency of the reference signal is gradually increased based upon a predetermined acceleration profile, the acceleration profile having a substantially S-shape.

20. The system of claim 17, wherein the closed loop circuitry generates a lock signal which is asserted thereby when the motor has reached the target speed, the lock signal being the only signal received by the controller from the closed loop circuitry.

* * * * *